(12) United States Patent
Bennardo et al.

(10) Patent No.: US 7,726,081 B1
(45) Date of Patent: Jun. 1, 2010

(54) HURRICANE NET WIND ABATEMENT SYSTEM

(76) Inventors: Frank L. Bennardo, 160 SW. 12th Ave. Suite 106, Deerfield Beach, FL (US) 33442; Michael Madden, 160 SW. 12th Ave. Suite 106, Deerfield Beach, FL (US) 33442

( * ) Notice: Subject to any disclaimer, the term of this patent is extended or adjusted under 35 U.S.C. 154(b) by 267 days.

(21) Appl. No.: 11/476,983

(22) Filed: Jun. 28, 2006

Related U.S. Application Data

(60) Provisional application No. 60/694,534, filed on Jun. 28, 2005.

(51) Int. Cl.
A44B 11/25 (2006.01)
E04D 1/34 (2006.01)
E04B 1/00 (2006.01)

(52) U.S. Cl. .................. 52/222; 52/4; 52/DIG. 12; 52/273; 24/584.1

(58) Field of Classification Search ............ 52/3–5, 52/23, DIG. 12, 273, 506.5; 160/382, 368.1; 24/459, 584.4, 586.1, 588.1, 589.1, 593.11; 248/508, 545; 5/417
See application file for complete search history.

(56) References Cited

U.S. PATENT DOCUMENTS

| | | | | | |
|---|---|---|---|---|---|
| 373,464 | A | * | 11/1887 | Ausnit | ............ 182/31 |
| 3,068,939 | A | * | 12/1962 | Commisso | ............ 160/392 |
| 3,353,548 | A | * | 11/1967 | Staller | ............ 135/87 |
| 3,715,843 | A | | 2/1973 | Ballinger | |
| 3,960,197 | A | | 6/1976 | Daniels | |
| 4,044,813 | A | | 8/1977 | Emmons | |
| 4,107,826 | A | * | 8/1978 | Tysdal | ............ 24/460 |
| 4,249,589 | A | | 2/1981 | Loeb | |
| 4,333,284 | A | * | 6/1982 | Meadows | ............ 52/222 |
| 4,441,290 | A | * | 4/1984 | Abell | ............ 52/202 |
| 4,447,935 | A | * | 5/1984 | Ausnit | ............ 24/456 |
| 4,566,236 | A | * | 1/1986 | Pound | ............ 52/222 |
| 4,662,038 | A | * | 5/1987 | Walker | ............ 24/460 |
| 4,665,670 | A | * | 5/1987 | van den Burg | ............ 52/222 |
| 4,694,543 | A | * | 9/1987 | Conley | ............ 24/461 |
| 4,815,562 | A | * | 3/1989 | Denny et al. | ............ 182/138 |
| 4,848,386 | A | * | 7/1989 | Cooper | ............ 135/90 |
| 4,867,222 | A | | 9/1989 | Roman et al. | |
| 4,961,981 | A | * | 10/1990 | Keegan | ............ 428/72 |
| 5,161,286 | A | * | 11/1992 | Herrington et al. | ............ 24/387 |
| 5,245,715 | A | * | 9/1993 | Dinkins | ............ 5/417 |

(Continued)

*Primary Examiner*—Richard E Chilcot, Jr.
*Assistant Examiner*—Elizabeth A Plummer
(74) *Attorney, Agent, or Firm*—Mark D. Bowen, Esq.; Malin Haley DiMaggio; Bowen & Lhota, P.A.

(57) ABSTRACT

A modular wind abatement system comprises a plurality of net components, net-to-net connection hardware, net-to-ground anchors and net-to-building anchors. Flexible net-like sheet components are configured and joined into a suitably sized and shaped web fitted in covering relation with a structure, such as a home, building, billboard, motor home, boat, or any other outdoor thing to be protected. Net component sections are joined together to form suitably sized and shaped web using clamp devices. Once formed the web is secured to the ground in at least partial covering relation with the protected structure by suitable ground anchors such that wind forces are transferred to ground anchors. The present invention thus provides a wind abatement device suitable for protecting a wide variety of structures and property from damage resulting from hurricane force winds and windborne debris.

3 Claims, 22 Drawing Sheets

U.S. PATENT DOCUMENTS

| | | | |
|---|---|---|---|
| 5,390,890 A * | 2/1995 | Ferguson et al. | 248/545 |
| 5,522,184 A | 6/1996 | Oviedo-Reyes | |
| 5,579,794 A * | 12/1996 | Sporta | 135/88.01 |
| 5,623,788 A | 4/1997 | Bimberg et al. | |
| 5,687,512 A | 11/1997 | Spoozak et al. | |
| 5,791,090 A * | 8/1998 | Gitlin et al. | 52/4 |
| 5,794,315 A * | 8/1998 | Crabtree et al. | 24/589.1 |
| 5,819,477 A | 10/1998 | Gaffney | |
| 5,881,499 A * | 3/1999 | Luzzi | 52/23 |
| 5,937,596 A | 8/1999 | Leeuwenburgh et al. | |
| 5,939,658 A | 8/1999 | Muller | |
| 5,966,877 A * | 10/1999 | Hawes | 52/63 |
| 5,983,572 A | 11/1999 | Laboy | |
| 6,032,433 A * | 3/2000 | Hatziathanasiou | 52/742.12 |
| 6,088,975 A * | 7/2000 | Wiegel | 52/169.1 |
| 6,176,050 B1 | 1/2001 | Gower | |
| 6,321,823 B1 * | 11/2001 | Whittemore | 160/368.1 |
| 6,324,797 B1 * | 12/2001 | Fago et al. | 52/222 |
| 6,325,085 B1 * | 12/2001 | Gower | 135/90 |
| 6,453,621 B1 * | 9/2002 | Bundy et al. | 52/3 |
| 6,865,852 B2 * | 3/2005 | Gower | 52/222 |
| 6,886,299 B2 * | 5/2005 | Gower | 52/222 |
| 6,895,613 B1 * | 5/2005 | Clouston | 5/417 |
| 7,159,256 B1 * | 1/2007 | Licari | 5/417 |
| 7,246,468 B2 * | 7/2007 | Forbis et al. | 52/3 |
| 2003/0217446 A1 * | 11/2003 | Hamlin et al. | 24/716 |
| 2004/0107655 A1 | 6/2004 | Hudoba | |
| 2004/0154242 A1 | 8/2004 | Hudoba et al. | |
| 2006/0150529 A1 * | 7/2006 | Hogg et al. | 52/3 |
| 2006/0207191 A1 * | 9/2006 | Sutton | 52/4 |
| 2008/0271298 A1 * | 11/2008 | Meager et al. | 24/589.1 |

* cited by examiner

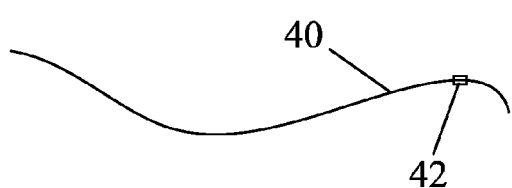
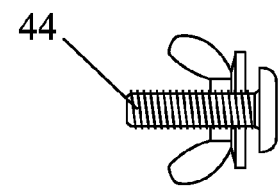
FIG. 3A					FIG. 3B
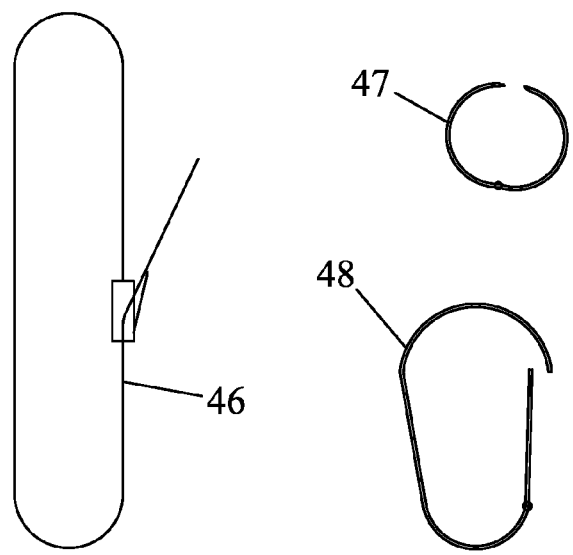
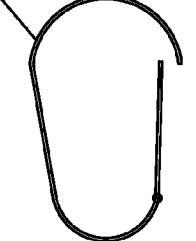
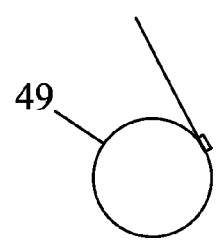
FIG. 3C			FIG. 3D			FIG. 3E

HURRICANE NET WIND ABATEMENT SYSTEM

CROSS REFERENCE TO RELATED APPLICATIONS

This application claims the benefit of provisional U.S. patent application Ser. No. 60/694,534, filed on Jun. 28, 2005.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights rights whatsoever.

BACKGROUND OF THE INVENTION

1. Field of the Invention

The present invention relates to wind abatement devices, and more particularly to a flexible wind abatement and impact system for protecting structures, such as buildings and signs, as well as openings within structures.

2. Description of Related Art

The United States has experienced numerous weather-related disasters in the past 20 years that have each caused in excess of $1 billion in damages. In 2004, the State of Florida was subjected to direct hits from multiple hurricanes the combined effect of which resulted in damages of approximately 20 billion dollars. In 2005, hurricanes Katrina and Wilma subjected Florida and the Southern Gulf Coast to devastating damage.

In addition, population growth along the coastline of the United States has resulted in an increased risk to life and property from hurricane related damage. There are approximately 40 million permanent residents along the hurricane-prone coastline of the United States, with areas such as Texas, Florida, and the Carolinas, where hurricanes frequently strike, experiencing rapid population growth. Furthermore, many coastal areas experience substantial but temporary population increases from holiday, weekend, and vacation visitors during hurricane season.

Homes, buildings, and other structures, suffer substantial damage when storm generated winds carrying windborne debris penetrate the structures through window and door openings Hurricane shutters have long been used as barriers to protect window and door openings from the effects of storm generated winds. Equipping homes and other buildings with hurricane protection in the form of storm shutters is one of the most prudent actions one can take to protect life and property.

Accordingly, the background art reveals a number of storm shutters and other devices designed for permanent or removable installation on homes and buildings. Conventional storm shutters typically consist of corrugated metal panels affixed to the outside of a given structure. For example, U.S. Pat. No. 2,878,536, issued to Becker, discloses a shutter structure having overlapping corrugated panels. U.S. Pat. No. 4,333,271, issued to DePaolo et al., discloses a hurricane panel system for covering windows and doors wherein a plurality of corrugated metal panels are arranged in overlapping relationship to provide a protective structure. U.S. Pat. No. 5,345,716, issued to Caplan, discloses a storm shutter system comprising a combination of individual, interlocking modular elements. U.S. Pat. No. 5,852,903, issued to Astrizky, discloses a hurricane shutter comprising a pair of normally open doors that are swingable to a closed position. U.S. Pat. No. 5,911,660, issued to Watson, discloses a storm panel comprising a plurality of interlocking tiles interlocked together by a plurality of dovetail joints.

A significant disadvantage with conventional storm shutter panels is that installation of the panels over all of the window openings prevents light from entering the structure thereby darkening the interior. Accordingly, if power is lost, as often happens during severe storms, the occupants of the structure find themselves in total darkness.

Accordingly, a number of references disclosed in the background art reveal attempts to provide storm shutters that provide sufficient impact resistance while allowing light to enter to building. For example, U.S. Pat. No. 5,918,430, issued to Rowland, discloses a removable storm shield comprising transparent convex panels. U.S. Pat. No. 5,996,292, issued to Hill et al., discloses a perforated shutter system wherein at least one panel is formed of corrugations. U.S. Pat. No. 3,358,408, issued to Cooper et al., discloses an insulated light transmitting panel construction having corrugations in the side edges thereof. U.S. Pat. No. 4,685,261, issued to Seaquist, discloses a removable translucent storm shutter consisting of a ½" thick polycarbonate sheet in an aluminum channel frame. U.S. Pat. No. 5,595,233, issued to Gower, discloses hurricane shutters formed of transparent, double-skinned panels that are strengthened by rods extending through the end channels. U.S. Pat. No. 5,457,921, issued to Kostrzecha, discloses a storm shutter wherein a plurality of corrugated shatter-resistant and transparent plastic sheets fastened to the structure using a mounting mechanism and fasteners inserted through key-way slots. In addition, U.S. Pat. No. 6,515,555, issued to Madden (a present inventor) discloses light transmitting storm shutter system for homes, buildings and the like. The Madden system provides a combination of corrugated aluminum and clear polycarbonate panels arranged in alternating adjacent and partially overlapping relation over a given window or door opening.

While storm panels are generally effective in protecting building openings, such systems are burdened by disadvantages. For example, storm panel systems are often overly complex, difficult to install, and expensive. One primary problem present with virtually all temporarily installed storm panels is that the panels are generally large and often very heavy, thereby rendering installation a difficult and time consuming task. As a result, many people, including the elderly and disabled, find installing storm panels difficult if not impossible without assistance.

In view of the disadvantages present in the art, the prior art further reveals the existence of alternative flexible wind abatement devices. For example, U.S. Pat. No. 5,937,596, issued to Leeuwenburgh et al., discloses a weather barrier kit is provided comprising double-faced tape used to bond a film to a window frame and a folded and rolled sheet of film having a stiffening band and strip of adhesive across the top. U.S. Pat. No. 5,939,658, issued to Muller, discloses a portable tactical shield system for shielding a doorway or window consisting of an armored curtain and a hook and loop fastening system. U.S. Patent Application No. 2004/0154242, issued to Hudoba, discloses a system for covering an opening in a structure includes a sheet of flexible material having opposed side edges. A thickened area and a pocket are formed at the side edges. A plurality of spaced apertures extend through the thickened area, and a rope is positioned in the pocket. A grommet assembly is positioned in each of the apertures to reinforce the apertures. A plurality of fasteners are carried by the structure and are spaced so that they can extend through the apertures.

While the flexible wind abatement devices revealed in the prior art are lighter in weight than conventional corrugated storm panels and thus have largely overcome some of the limitations referenced above, they are primarily designed and intended to cover relatively small window and door openings largely fail to provide a system that is sufficiently adaptable to secure entire buildings or other property from the destructive effects of hurricane force winds.

In that regard, the background art reveals several attempts directed to providing wind abatement devices capable of securing buildings and structures by essentially tying down the roof. For example, U.S. Pat. No. 5,522,184, issued to Oviedo-Reyes, discloses a net member positioned over the roof of the building structure with cables used to interconnect support beam members with the net to keep the net in place, and anchorage assemblies keep support beam members in place. This system fails to provide protection for the windows or doors. U.S. Pat. No. 5,623,788, issued to Bimberg et al., discloses a roof anchoring system wherein roof-engaging plates are arrayed over the top of a roof and connected by cables. Ground engaging assemblies are provided to anchor the roof-engaging plates to the ground. Bimberg does not provide protection for the sides of the structure. U.S. Pat. No. 5,819,477, issued to Gaffney, discloses a system for securing a building roof using a plurality of lines and ground anchors. Netting material is used to span the lines on the roof U.S. Pat. No. 5,983,572, issued to Laboy discloses a roof tie-down arrangement for preventing damage to a roof by attachment of support members anchored by cables.

The background art, however, fails to disclose a modular wind abatement system sufficiently adaptable to protect a wide variety of real and personal property from hurricane force wind damage. More particularly, the background art fails to provide a wind abatement system adapted for custom installation on any of a wide variety of real property (e.g. buildings and homes) as well as personal property (e.g. boats and motor homes). Accordingly, there exists a need for such a wind abatement system that overcomes the disadvantages and limitations present in the background art.

BRIEF SUMMARY OF THE INVENTION

The present invention overcomes the various limitations and disadvantages present in the art by providing a wind abatement apparatus comprising a modular system including a plurality of net components, ground & building connections, and net-to-net connection hardware. In accordance with the present invention, flexible net-like sheet components are configured and joined into a suitably sized and shaped web fitted in covering relation with a structure, such as a home, building, billboard, motor home, boat, or any other outdoor thing to be protected. In a preferred embodiment, the wind abatement system of the present invention includes a plurality of modular net component sections provided in pre-cut roll form for installation in covering relation with a structure to be protected. Individual net component sections are joined together to form suitably sized and shaped web using clamp devices. Once formed the web is secured to the ground in at least partial covering relation with the protected structure by suitable ground anchors such that wind forces are transferred to ground anchors. The present invention thus provides a wind abatement device suitable for protecting a wide variety of structures and property from damage resulting from hurricane force winds and windborne debris.

Accordingly, it is an object of the present invention to provide a versatile wind abatement system adaptable for use with a wide variety of structures to protect against wind related damage.

Another object of the present invention is to provide a wind abatement system that is inexpensive and easy to install.

Still another object of the present invention is to provide a wind abatement system that protects an entire structure or other object by virtual total encapsulation within a ground-anchored web.

Yet another object of the present invention is to provide a wind abatement system that may also be configured to protect window and door openings in a structure.

A further object of the present invention is to provide a wind abatement system of modular design allowing for a limitless range of configurations capable of protecting virtually any size or shape structure of object.

In accordance with these and other objects, which will become apparent hereinafter, the instant invention will now be described with particular reference to the accompanying drawings.

BRIEF DESCRIPTION OF THE SEVERAL VIEWS OF THE DRAWINGS

FIGS. 3A-3D depict additional hardware components for use with the present invention;

Figure 31:
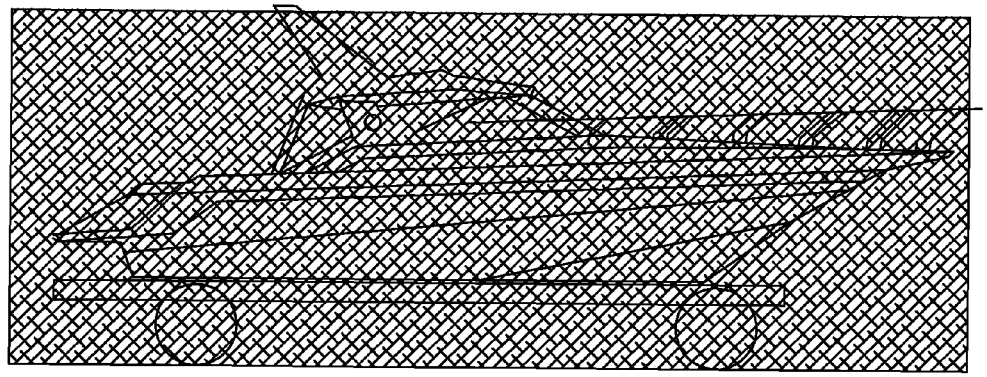
Figure 32:
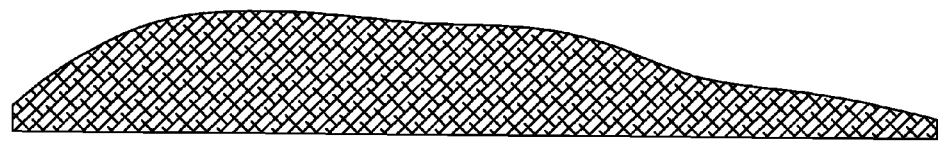
Figure 33:
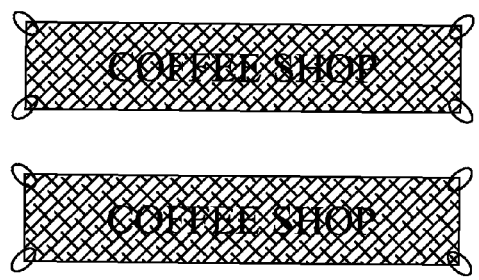
Figure 34:
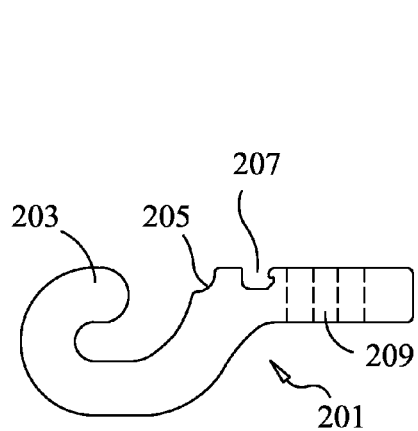
Figure 35:
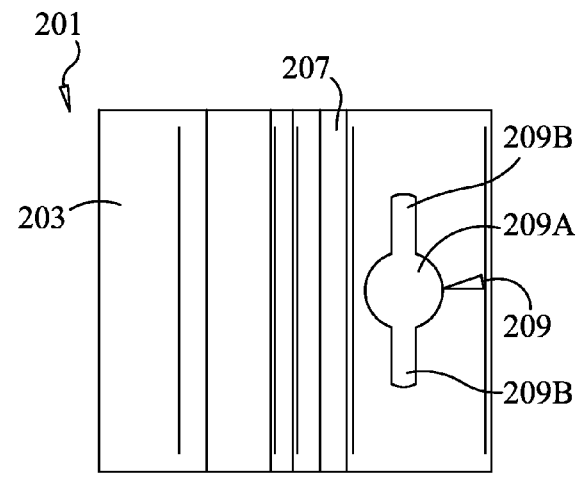
Figure 36:
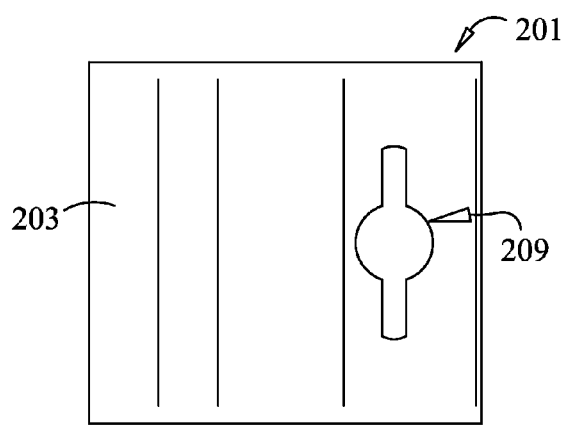
Figure 37:
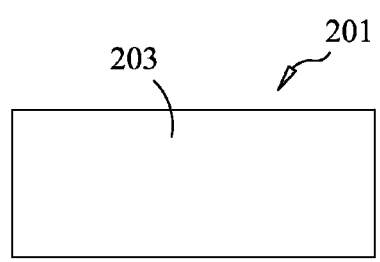
Figure 38:
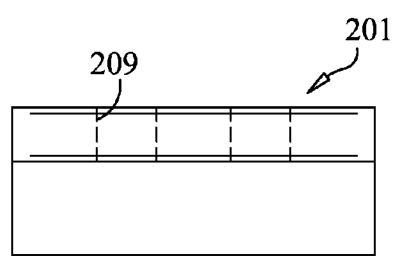
Figure 39:
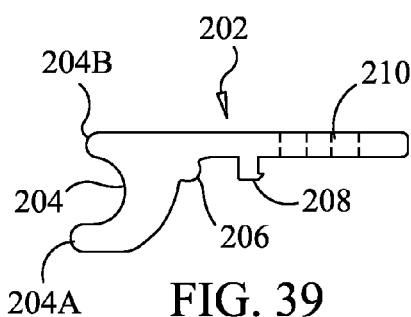
Figure 40:
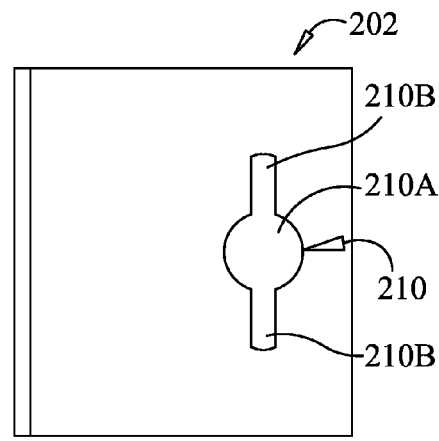
Figure 41:
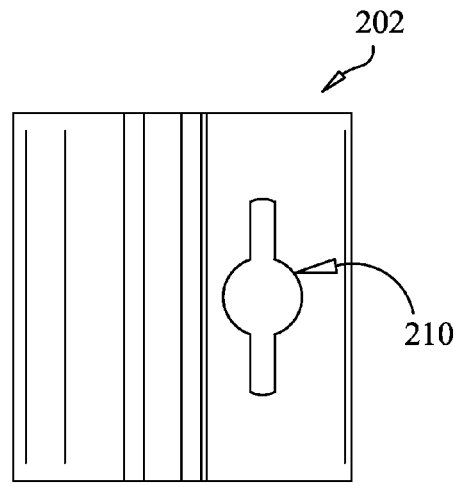
Figure 42:
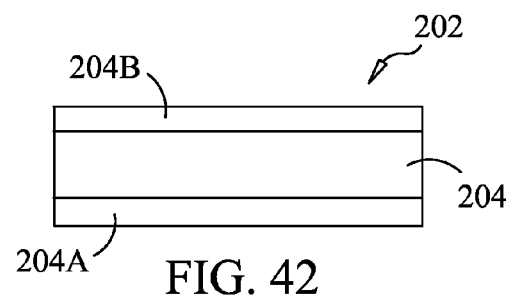
Figure 43:
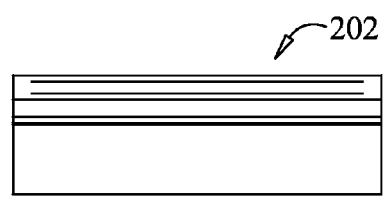
Figure 44:
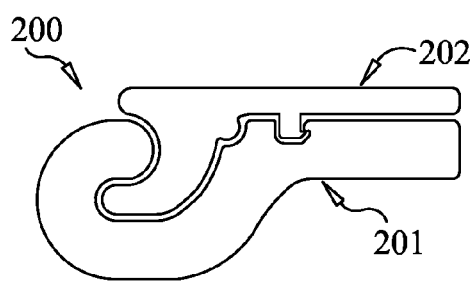
Figure 45:
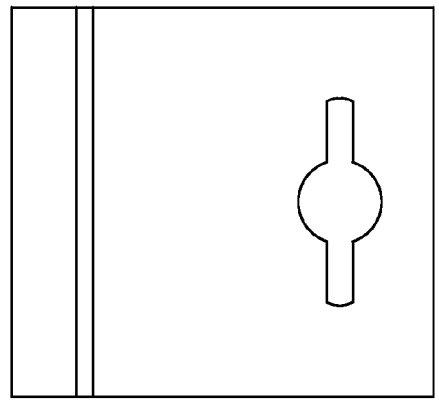
Figure 46:
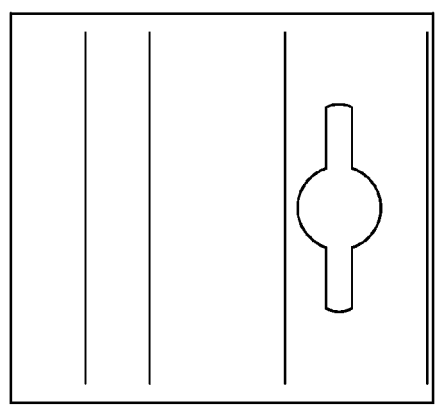
Figure 47:
Figure 48:
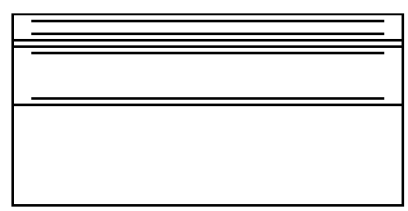
Figures 53, 54, 55:
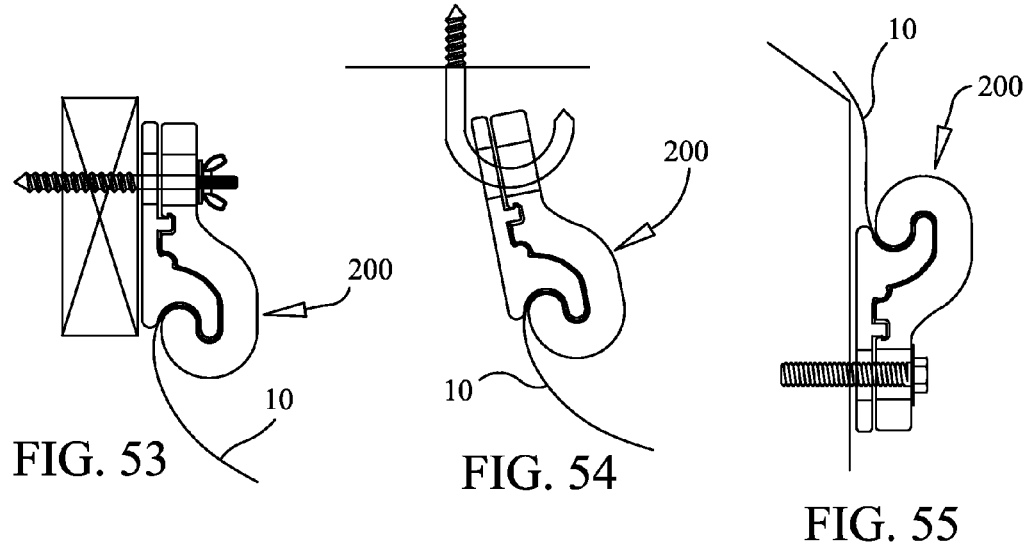
Figures 56, 57:
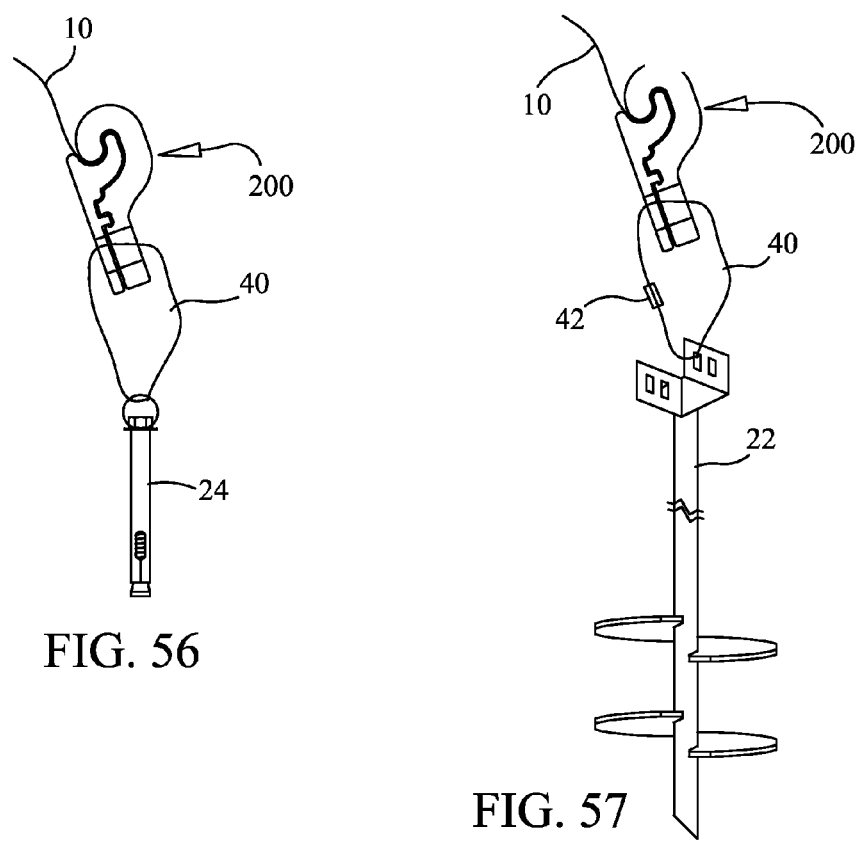
Figure 58:
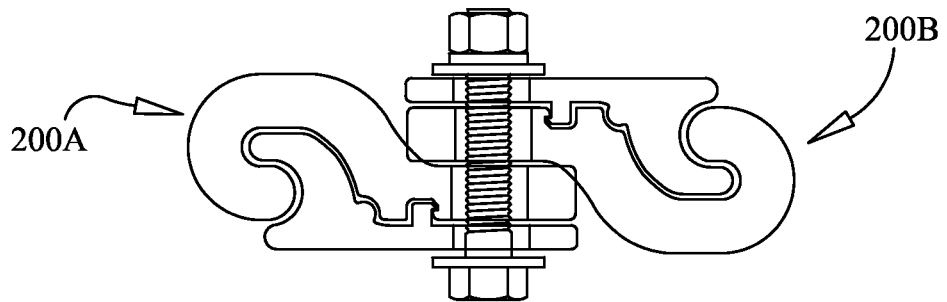
Figure 59:
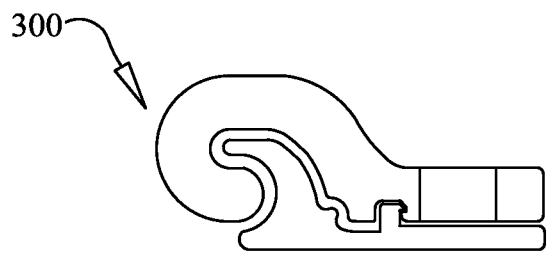
Figure 60:
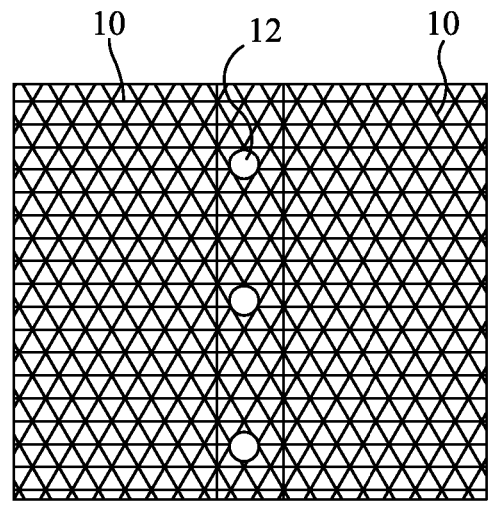
Figure 61:
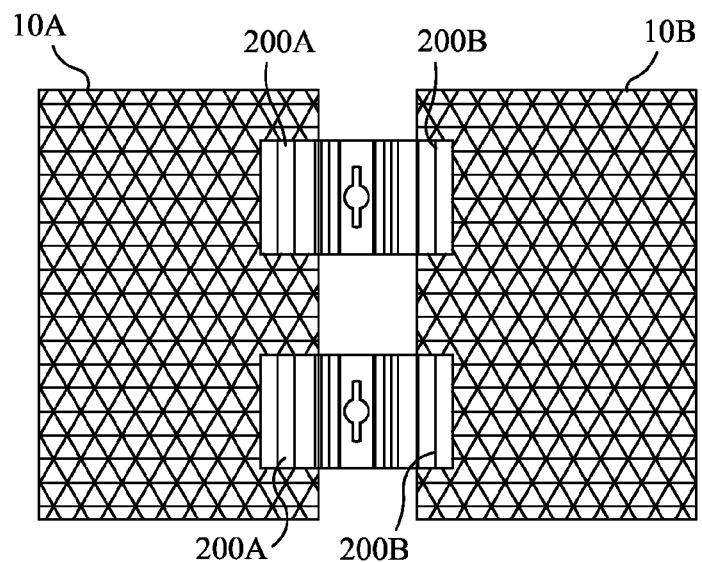
Figure 62:
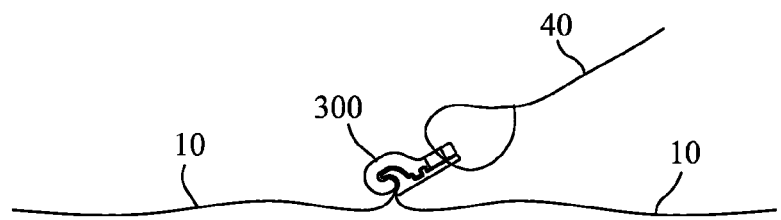
Figure 63:
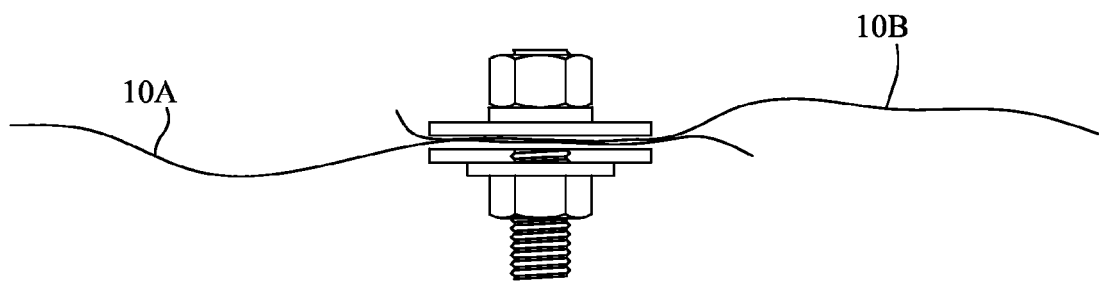
Figure 64:
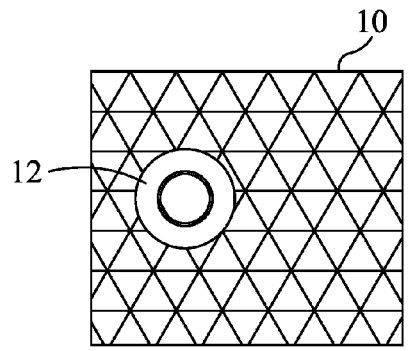
Figure 67:
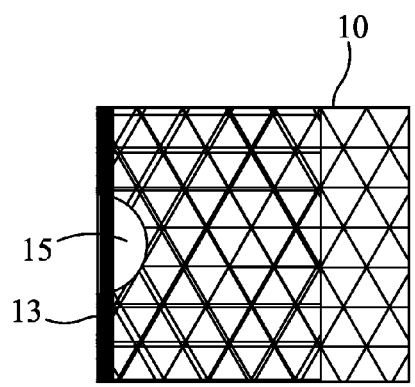
Figure 65:
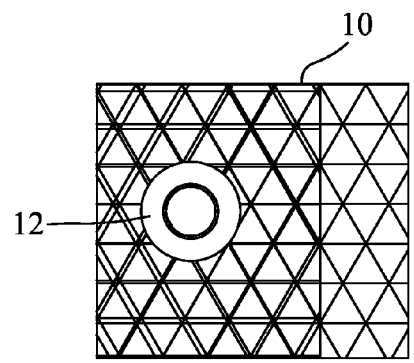
Figure 66:
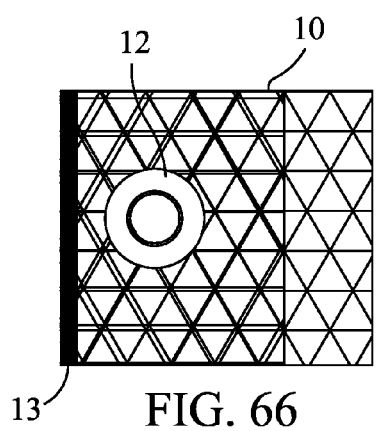

FIG, 30 is a sectional view of a structure adapted with the hurricane net wind abatement system configured to protect window and door openings;

FIG. 31 illustrates the hurricane net wind abatement system configured to protect a marine vessel and trailer;

FIG. 32 illustrates the hurricane net wind abatement system configured to protect a pile of foliage, landscaping, or debris;

FIG. 33 depicts a hurricane net wind abatement system according to the present invention adapted with attached advertising graphics;

FIG. 34 is a side view of a first net clamp component in accordance with a preferred clamp embodiment;

FIG. 35 is a top view thereof;

FIG. 36 is a bottom view thereof;

FIG. 37 is an end view thereof;

FIG. 38 is an opposing end view thereof;

FIG. 39 is a side view of a second net clamp component in accordance with a preferred clamp embodiment;

FIG. 40 is a top view thereof;

FIG. 41 is a bottom view thereof;

FIG. 42 is an end view thereof;

FIG. 43 is an opposing end view thereof;

FIG. 44 depicts the first and second preferred embodiment net clamp components in a matingly connected configuration;

FIG. 45 is a top view thereof;

FIG. 46 is a bottom view thereof;

FIG. 47 is an end view thereof;

FIG. 48 is an opposing end view thereof;

FIGS. 49-52 illustrate connection of a net edge using the preferred embodiment net clamp components;

FIG. 53 illustrates anchoring of a net clamp to a wooden member;

FIG. 54 illustrates anchoring of a net clamp to a hook member;

FIG. 55 illustrates anchoring of a net clamp using a threaded wall fastener;

FIG. 56 depicts securing a net clamp using a concrete anchor;

FIG. 57 depicts securing a net clamp using a ground anchor;

FIG. 58 depicts attachment of a pair of clamps;

FIG. 59 illustrates an embodiment with wider spacing to secure two overlapping net sections;

FIG. 60 illustrates connecting adjoining net sections by alignment of gronimets;

FIG. 61 illustrates connecting adjoining net sections using connected clamps as shown in FIG. 58;

FIG. 62 illustrates a net-to-net connection using a clamp and anchoring the clamp with a rope or cable;

FIG. 63 illustrates a net-to-net connection using a threaded fastener and washers inserted through aligned grommets;

FIG. 64 depicts a grommet installed through a single layer of net material;

FIG. 65 depicts a grommet installed through a double hemmed layer of net material;

FIG. 66 depicts a grommet installed through a double hemmed layer of net material with a reinforcing bar;

FIG. 67 depicts a grommet-less anchor point with a reinforcing bar; and

Figure 68:
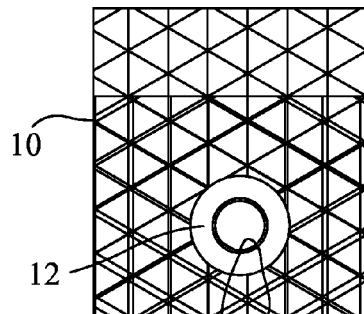
Figure 68:
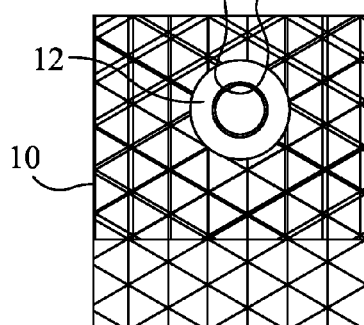

FIG. 68 depicts a net-to-net connection.

DETAILED DESCRIPTION OF THE INVENTION

Figure 1:
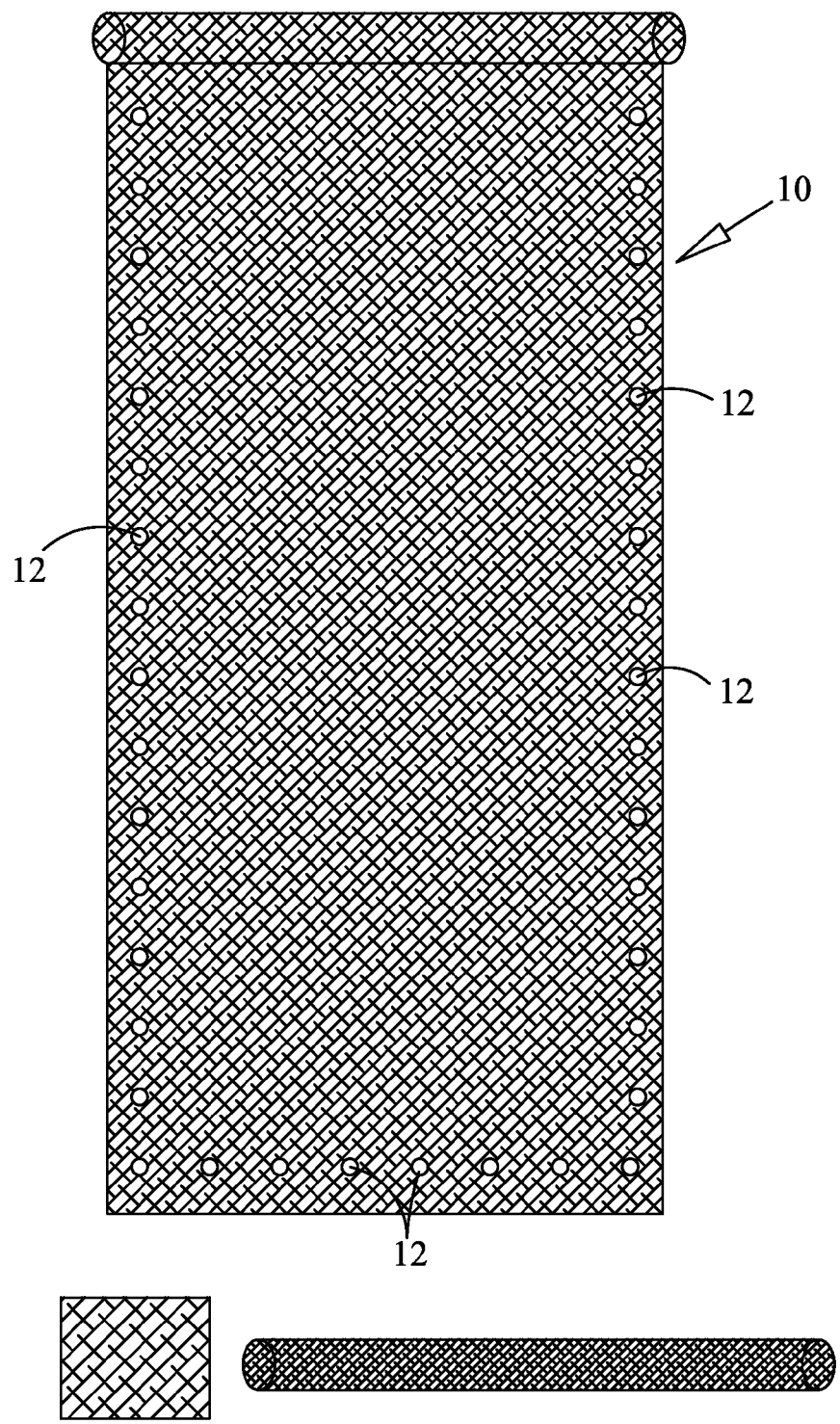
FIG. 1 shows a net component ("hurricane net") for a wind abatement system in accordance with the present invention in a partially rolled-up configuration.

With reference now to the drawings, FIGS. 1-68 depict a preferred embodiment of the hurricane net wind abatement system according to the present invention. The present invention provides a hurricane net wind abatement system comprising a plurality of net components, ground & building connections, and net-to-net connection hardware. In accordance with the present invention, flexible net-like sheet components are configured and joined into a suitably sized and shaped web fitted in covering relation with a structure, such as a home, building, outdoor sign, billboard, motor home, boat, or any other outdoor object in need of protection. In a preferred embodiment, the wind abatement system of the present invention includes a plurality of modular net component sections provided in precut roll form for installation in covering relation with a structure to be protected. Individual net component sections are joined together to form suitably sized and shaped web using clamp devices. Once formed the web is secured to the ground in at least partial covering relation with the protected structure by suitable ground fasteners. The present invention thus provides a wind abatement device suitable for protecting a wide variety of structures and property from damage resulting from hurricane force winds and wind-borne debris.

FIG. 1 depicts a primary net section component of the present invention, generally referenced as 10. Net component 10 comprises a flexible sheet of woven material, and is preferably provided in sections for ease of handling and storage. Net component 10 is preferably fabricated and available in a variety of sizes including 10'×8', 15'×8', 20'×8', 25'×8', 50'×8', 75'×8', and 100'×8'. It should be noted, however, that any suitable section size is considered within the scope of the present invention. It should be noted that the preferred size of net component sections 10 disclosed above have been selected primarily for the reason that when in a roll configuration, the net is neither too heavy nor too large to be lifted and handled by a single worker. Thus, other dimensions for net component sections fall within the scope of the present invention. Net component 10 is preferably fabricated from a PVC coated polyester core yarn, and woven into a sturdy flexible sheet. Such material is available from Twithcell Corporation of Dothan, Ala. under the product name TEXTILENE (Item No. T30S10470). The net material is further characterized as having approximately 47% open face area and 53% solid face area.

Each net section 10 is preferably adapted with a plurality of grommets 12 fixed in spaced relation in proximity to the peripheral edges thereof. Grommets 12 are preferably spaced a suitable distance apart, such as 12", 18", or 24" on center along each edge of net component 10. As best depicted in FIGS. 64-67, grommets may be attached through a single layer of net material as seen in FIG. 64, or through a double hemmed layer of net material as seen in FIG. 65, or through a double hemmed layer of net material with a reinforcing spline 13, such as a rigid bar as seen in FIG. 66. FIG. 67 depicts an alternate net edge configuration wherein the net is adapted with a hole such that when folded a semi-circular aperture 15 is formed and the folded edge is reinforced with a rigid bar 13. Adapting the net components with various apertures as seen in FIGS. 64-67 provides net components that may be secured together with rope, zip ties, fabric ties, hooks, or other suitable securing structure.

Figure 2A:
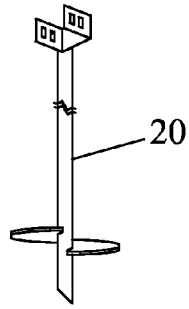
FIGS. 2A-2G depict various ground anchors and building fasteners for securing the wind abatement system of the present invention.
Figure 2B:
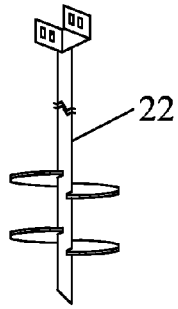
Figure 2C:
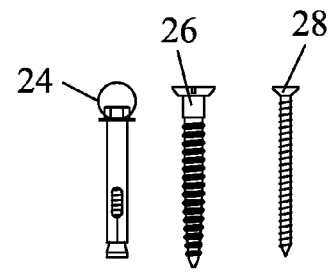
Figure 2D:
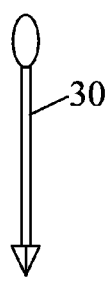
Figure 2E:
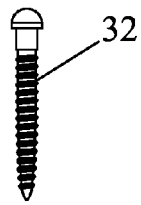
Figure 2F:
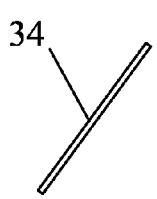
Figure 2G:
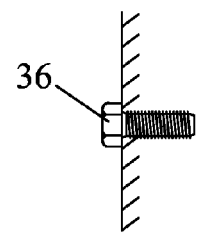

FIGS. 2A-2G depict various ground anchors and building fasteners suitable for use with the present invention. FIGS. 2A and 2B depict standard and high capacity helical soil anchors, referenced as 20 and 22 respectively. The helical soil anchors are generally characterized as comprising an elongate rigid shaft having radially projecting helically configured threads for engaging soil upon installation by a screw-type rotation into the soil. FIG. 2C depicts various fasteners, including a concrete anchor 24, and threaded fasteners 26 and 28 suitable for use with various surfaces such as wood and metal. FIG. 2D depicts a wire earth anchor 30 for use in applications involving soil, asphalt, and the like. These anchors are preferably installed by driving the tip portion thereof into the soil using a ground rod and steel post driver. FIG. 2E depicts a removable ground "screw" anchor 32, also for use with soil. FIGS. 2F and 2G illustrate that suitable anchors for use with the present invention further include metal stakes or rods, referenced as 34, as well as existing hurricane shutter anchors 36.

Furthermore, FIGS. 3A-3E depict additional hardware components suitable for use with the present invention to connect net components together, to connect net components to ground anchors, and to provide window and door tie-downs as further discussed hereinbelow. FIG. 3A depicts a rope 40 having a compression ring 42 attached thereto. FIG. 3B illustrates a bolt and wing nut fastener, generally referenced as 44. FIG. 3C depicts a tension strap 46. FIGS. 3D and 3E depict openable ring hooks, referenced as 47 and 48, while FIG. 3E depicts a zip cord or tie wrap device 49.

Figure 4A:
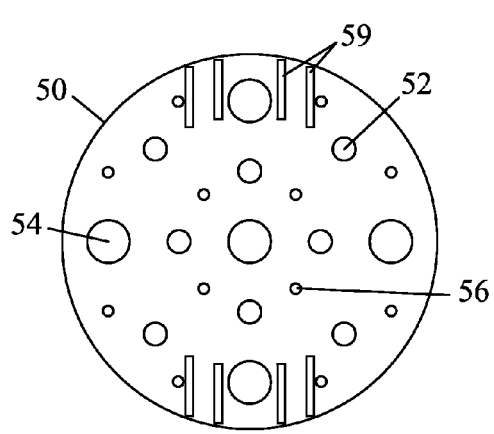
FIG. 4A is a front view of a connector plate fomiing on half of universal clamp mechanism for use in various connection configurations.
Figure 4B:
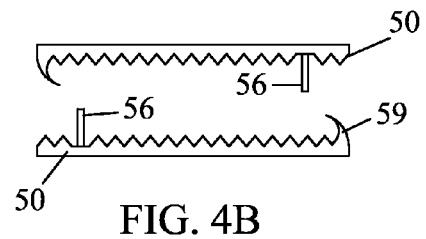
FIG. 4B is an exploded side view of the universal clamp mechanism shown in FIG. 4A.
Figure 4C:
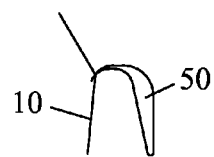
FIG. 4C illustrates use of the universal clamp mechanism in a pull configuration.
Figure 5A:
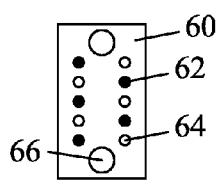
FIG. 5A is a front view of an alternate embodiment connecting plate used in net-to-net clamping and net-to-wall clamping.
Figure 5B:
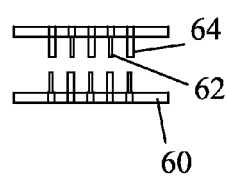
FIG. 5B is a side view depicting a pair of the connecting plates in spaced face-to-face relation to form a clamp.

A significant aspect of the present invention further relates to specially configured clamps for use in connecting components in accordance with the present invention. FIGS. 4A-4C depict connector plates, referenced as 50, that may be used either alone or with a mating connector plate to function as an end clamp, center clamp, seam clamp, or pull clamp configurations. FIG. 4A is a front view of connector plate 50 for use in securing net components 10 of the present invention. In a preferred embodiment, connector plate 50 comprises a plate that includes a plurality of various sized apertures, including ¼" diameter fastener apertures 52, and ½" diameter rope apertures 54. While the embodiment depicted in FIG. 4A is circular, any suitable shape is considered within the scope of the present invention. Connector plate 50 further includes projecting pegs 56 and peg holes 58, that are correspondingly sized and positioned to allow for mating engagement of two connector plates in generally face-to-face relation as seen in FIG. 4B. When a pair of connector plates are so connected with a portion of one or more net components sandwiched between the plates in a clamp configuration, pegs 56 function to secure the connector plates relative to the net component(s). Connector plate 50 may further have a face portion defining a saw tooth, or sine wave surface to further facilitate interlocking engagement when disposed in face-to-face relation, and further to anchor the connector plates relative to net components. Finally, connector plate 50 may include an end portion defining a hook member 59 to provide hooked engagement with a net component 10 to facilitate tie down. FIG. 4C depicts a connector plate 50 in such a configuration wherein hook member 59 engages net component 10. As should be apparent, a rope 40 or other hardware device may be connected to plate 50 and a ground anchor (not shown in FIG. 4C) in a tie-down configuration.

Figure 6:
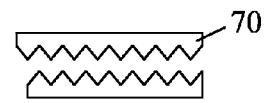
FIGS. 6 and 7 are alternate embodiment of connecting plates disposed in face-to-face relation to form a clamp.
Figure 7:

FIGS. 5-10 depict alternate clamp devices suitable for use with the present invention. FIGS. 5A and 5B depict an alternate plate, referenced as 60, comprising a generally flat plate having a face adapted with projecting pegs 62 and correspondingly sized tubular elements 64. Alternate plate 60 further includes opposing ends, each of which defines an aperture 66. FIG. 5B depicts a pair of the alternate plates 60 disposed in spaced face-to-face relation such that pegs 62 are generally aligned with tubular elements 64 for mating telescopic inserted reception therein. As should be apparent, plates 60 function to clamp and secure a net disposed therebetween since pegs 62 and tubular elements 64 are generally inserted through the webbing of the component net. FIGS. 6 and 7 depict alternate embodiment plates, generally referenced as 70 and 72 respectively. Plates 70 shown in FIG. 6 each have opposing face surfaces defining a saw tooth pattern configured for mating face-to-face relation. Plates 72 shown in FIG. 7 each have opposing face surfaces defining a wave pattern configured for mating face-to-face relation. Any pair of plates 60, 70, and 72 may be securely attached to one or more net components and fastened with conventional nut and bolt fasteners to form a clamp with the net component disposed between opposing plates.

Figure 8:
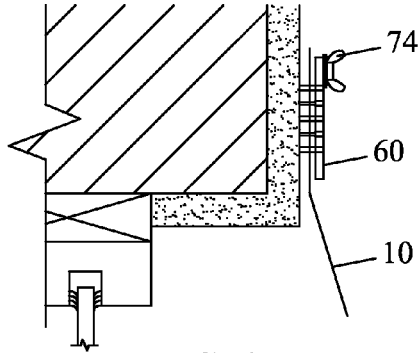
FIG. 8 shows the connecting plate depicted in FIG. 5A in a net-to-wall connection configuration using existing anchors.
Figures 9, 10:
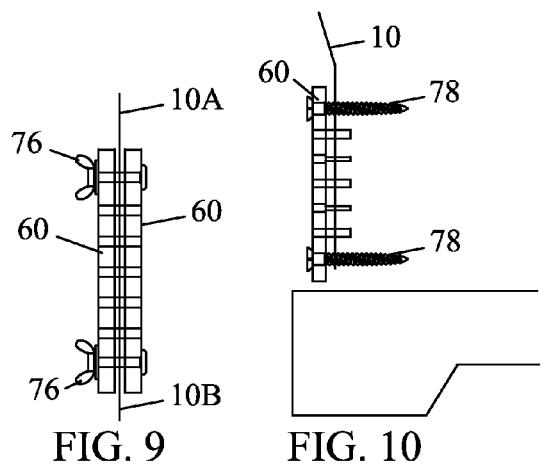
FIG. 9 illustrates the clamp shown in FIG. 5B in a net-to-net connection configuration.
FIG. 10 illustrates the connecting plate depicted in FIG. 5A in a net-to-wall connection configuration using threaded fasteners.

The plates disclosed herein may be used in a variety of configurations. FIG. 8 depicts plate 60 in a configuration intended to secure a net component 10 to a structure (shown in sectional view) using existing storm panel fasteners 74. FIG. 9 depicts a pair of plates 60 connected in face-to-face relation by nut and bolt fasteners 76 to interconnect two net components, referenced as 10A and 10B. FIG. 10 illustrates use of a plate 60 and threaded fasteners 78 to connect a net component to a wall.

Figure 11:
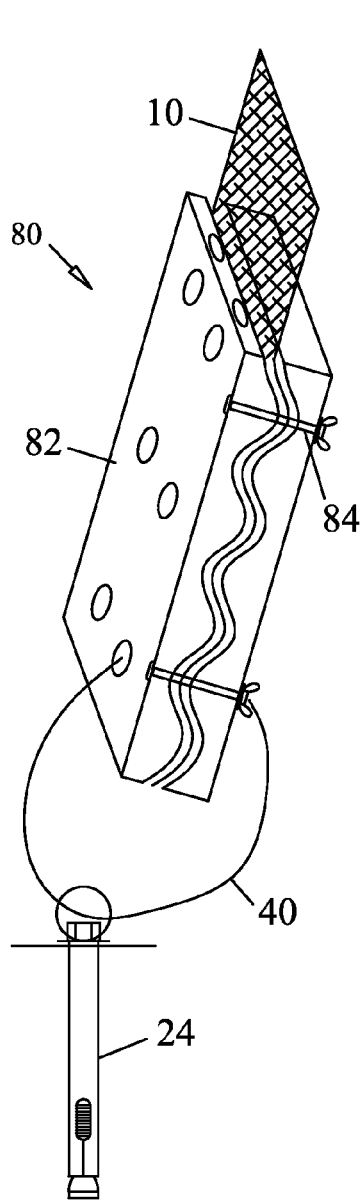
FIG. 11 illustrates the clamp depicted in FIG. 7 in a net-to-ground anchoring configuration.
Figure 12:
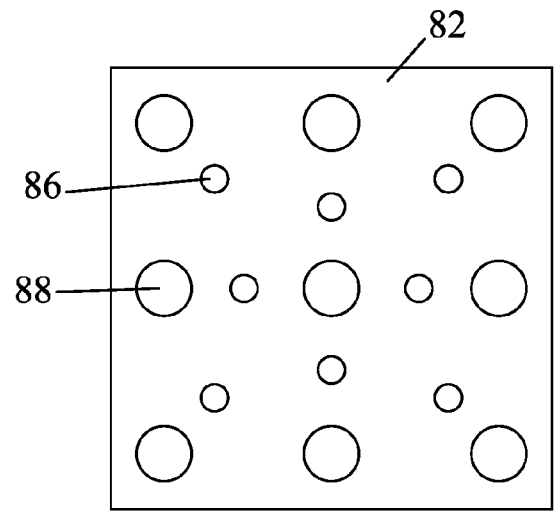
FIG. 12 is a front view of the clamp depicted in FIG. 11.
Figure 13:
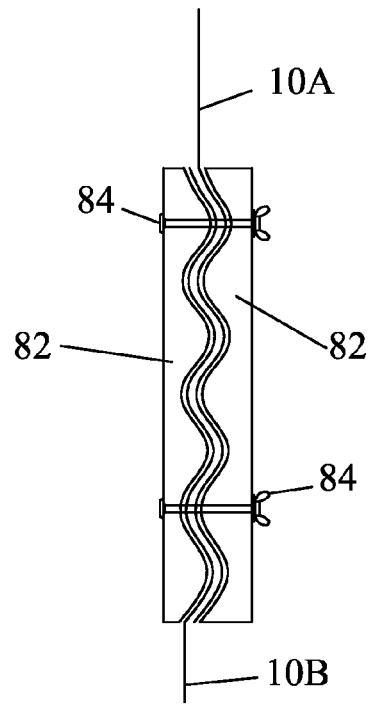
FIG. 13 is a side view thereof.

FIGS. 11-13 show a wave clamp, generally referenced as 80. FIG. 12 shows a plate 80 adapted for use with an identical plate to form a clamp. More particularly, wave clamp 80 includes a pair of plates, referenced as 82, having wave shaped surfaces disposed and fastened in face-to-face relation in a ground anchor configuration. As best seen in FIG. 12, each plate 82 defines a plurality of fastener apertures 86 and rope apertures 88, for receiving fasteners and ropes respectively. In the ground anchor configuration plates 82 are secured with an edge portion of a net component 10 sandwiched between opposing plates 82 by fasteners 84. FIG. 11 shows clamp 80 secured by a cable or rope 40, passing through rope apertures 88 and tied to a concrete ground anchor 24. FIG. 13 shows a side view of a wave clamp 80 configured to connect two net component sections, 10A and 10B, sandwiched between opposing plates 82 and secured with fasteners 84. As should be apparent, wave clamp 80 may be adapted for a variety of uses, including the tie-down use shown in FIG. 11, and for connecting net components or patching tears in net components as depicted in FIG. 13.

Figure 14:
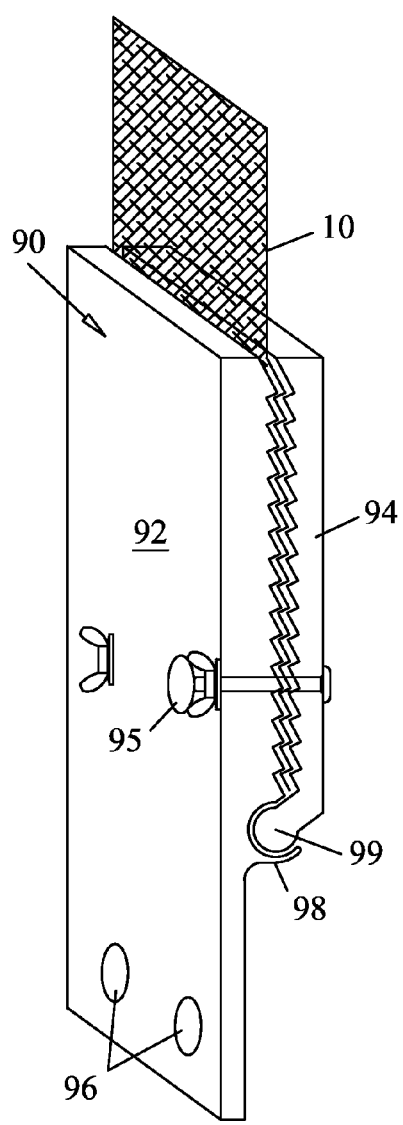
FIG. 14 is a perspective view of a saw tooth clamp mechanism.
Figure 15:
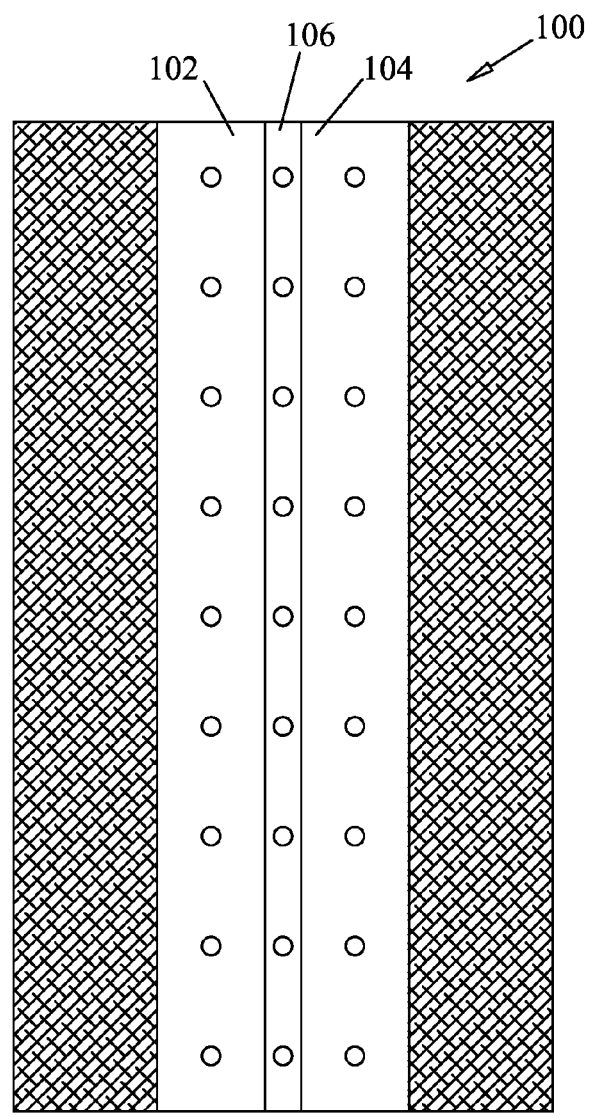
FIG. 15 is an alternate connecting mechanism.

FIG. 14 depicts an additional clamp mechanism referred to as a saw clamp 90 for use with the present invention. Saw clamp 90 includes first and second clamp plates, referenced as 92 and 94 respectively, that are pivotally connected and movable between a closed configuration (shown) and an open configuration (not shown). Clamp plates 92 and 94 preferably include opposing face surfaces defining interlocking saw-tooth patterns to facilitate secure connection to a portion of a net component 10 disposed therebetween when clamp 90 is in the closed configuration depicted in FIG. 14. Clamp plate 92 is preferably an elongate plate member having a face defining a saw-tooth surface and an end portion defining at least one, and preferably a pair of apertures 96 for use in securing clamp 90 in a tie-down configuration. Plate 92 further includes an elongate socket 98 sized for mating pivotal engagement with an elongate rounded end portion 99 of plate 94 to facilitate pivotal opening and closing of plates 92 and 94. Plates 92 and 94 further define a pair of fastener receiving apertures, referenced as 95, for receiving threaded fasteners to secure plates 92 and 94 is the closed configuration as depicted in FIG. 14. FIG. 15 an alternate embodiment of the clamp mechanism 100 that provides a substantially continuous clamp suitable for use in connecting net sections around windows and doors. Clamp mechanism 100 preferably includes opposing left and right clamp sides, referenced as 102 and 104 respectively, connected by a piano hinge member 106.

Figure 16:
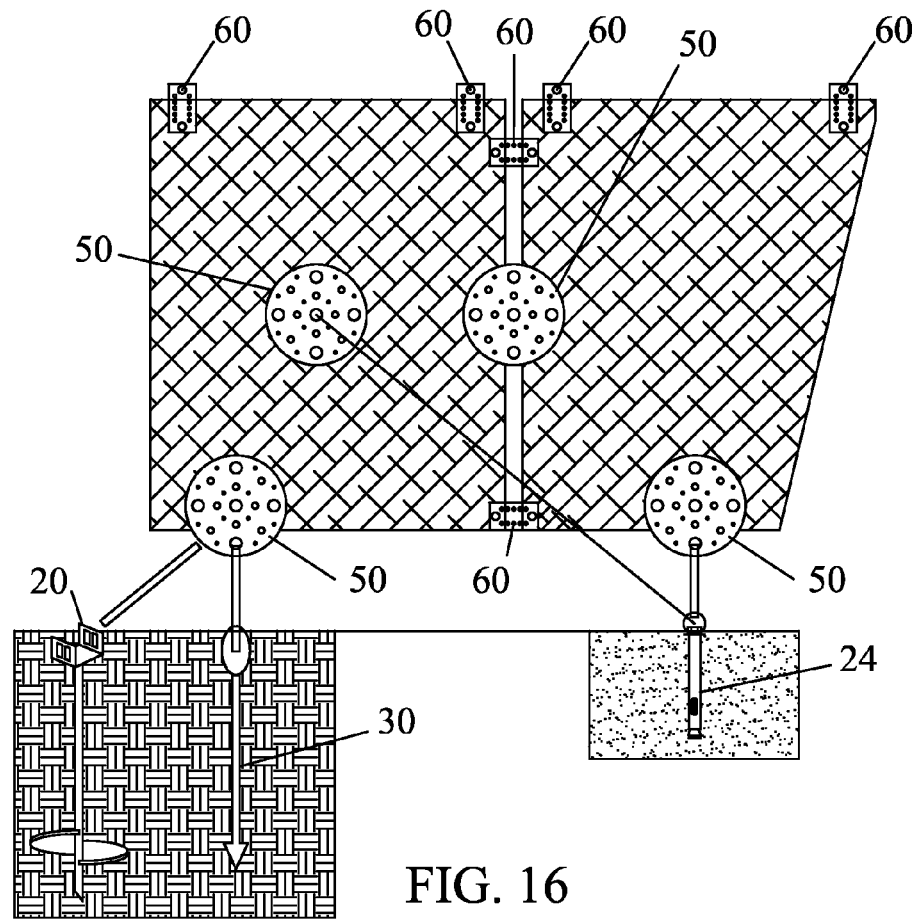
FIG. 16 illustrates net components installed in covering relation with a window opening on a structure and secured in spaced relation with the window using ground anchors.
Figure 17:
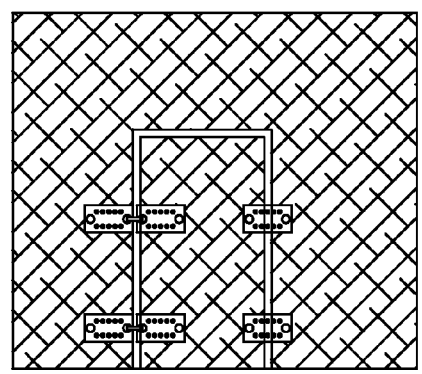
FIG. 17 illustrates net components installed in a configuration that facilitates use of a doorway.

FIGS. 16 and 17 depict various installations using the hurricane net wind abatement system of the present invention. More particularly, FIG. 16 depicts two net sections, referenced as 110 and 112, secured in external proximity to a structure wherein the net sections are connected together using connector plates 50 and alternate connector plates 60 to connected net sections 110 and 112 in adjacent relation. In addition, connector plates 60 are employed along the top edge of net sections 110 and 112 to secure the net assembly to a structure by direct connection to the walls, roof, or existing storm shutter anchor points. Connector plates 50 are also employed to attach the bottom edge of the net assembly to the ground using helical ground anchors 20, wire earth anchors 30, concrete anchors 24, or any other suitable anchor apparatus. Finally, connector plates 50 may be further employed by connection to the middle region of a net section to pull the net away from the structure in a secured configuration to resist deflection toward the structure, particularly around windows and doors. FIG. 16 depicts connection of a plate 50 to concrete ground anchor 24 in such a configuration. FIG. 17 depicts net sections cut and attached at a door opening.

Figure 18:
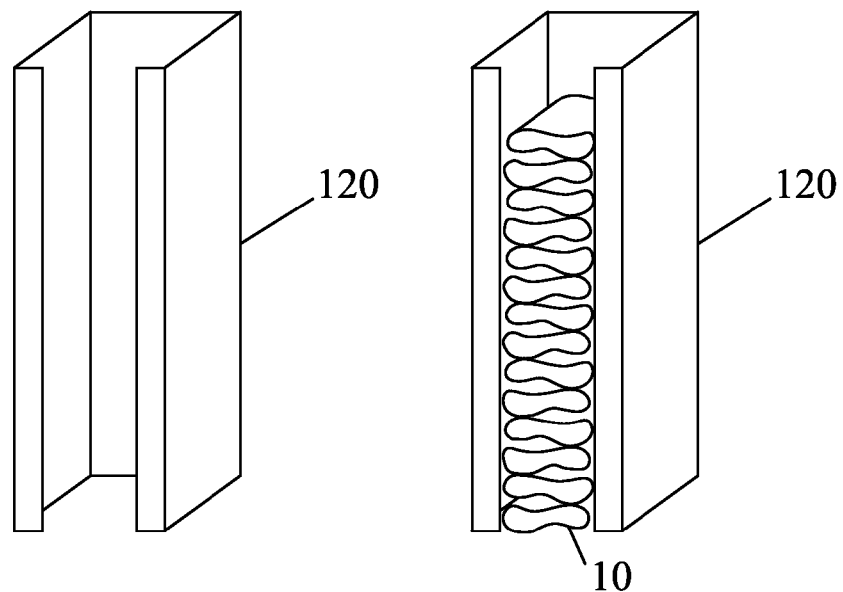
FIG. 18 depicts net component storage chutes for use with the present invention.
Figure 19:
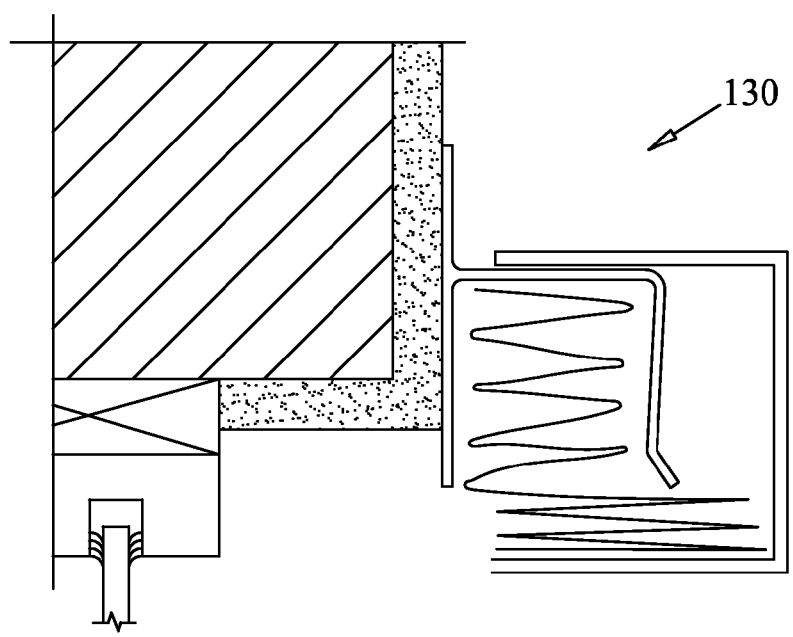
FIG. 19 is a side sectional view of a window header roll up storage box for use with the present invention.
Figure 20A:
FIGS. 20A and 20B show front and side views of a ground sign.
Figure 20B:
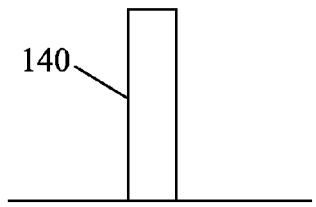

FIGS. 18 and 19 depict various storage structures for use with the present invention. More particularly, FIG. 18 depicts a vertical storage chute 120 adapted for receiving net component sections 10 in a folded configuration. Storage chute 120 may be floor mounted as depicted in FIG. 18, or may be wall or ceiling mounted (not shown). FIG. 19 depicts an alternate embodiment storage structure, namely, a window header roll up box, generally referenced as 130. Window header roll up box 130 preferably includes a mounting bracket 132 and a U-shaped box structure 134 mounted to bracket 132 as best depicted in FIG. 19.

Figure 21A:
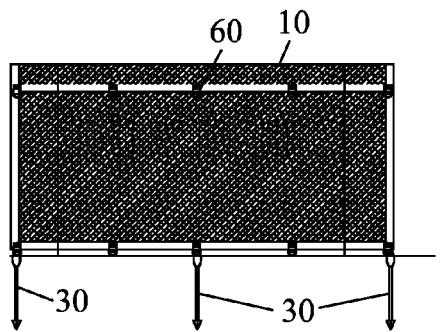
FIGS. 21A and 21B show front and side views of the ground sign shown in FIGS. 20A and 20B having a hurricane net wind abatement system of the present invention installed.
Figure 21B:
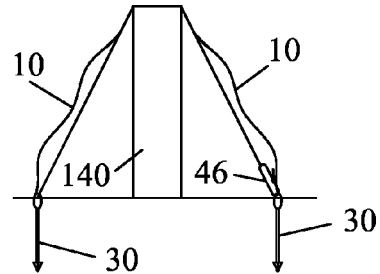
Figure 22:
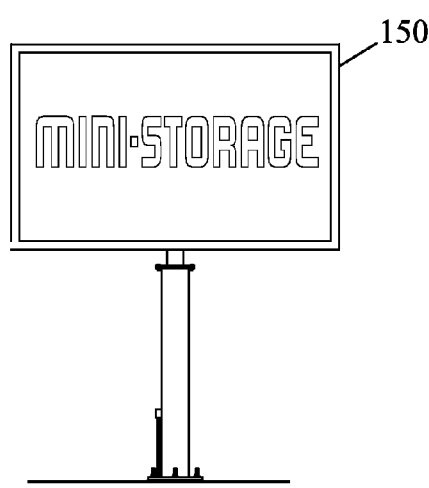
FIG. 22 is a front view of an elevated sign.
Figure 23:
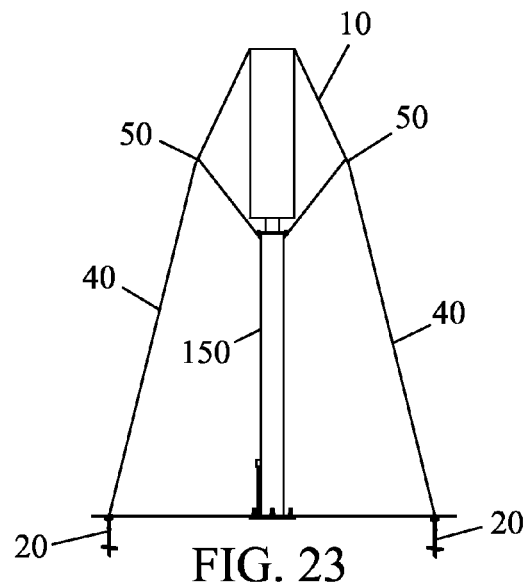
FIG. 23 is a side view of an elevated sign protected by the hurricane net wind abatement system of the present invention.

FIGS. 20A, 20B, 21A, and 21B, depict use of a hurricane net wind abatement system according to the present invention to secure a ground sign, generally referenced as 140. FIGS. 21A and 22A depict the hurricane net wind abatement system of the present invention, generally referenced as 10, disposed in covering anchored relation with ground sign 140, using a plurality of connector plates 60, ground anchors 30, and tension straps 46. Similarly, FIGS. 22 and 23 depict use of a hurricane net wind abatement system of the instant invention, generally referenced as 10, to secure an elevated sign, referenced as 150. As best seen in FIG. 23, elevated sign 150 is secured by one or more net sections and anchored to the ground by rope 40 and ground anchors 20 connected to intermediate net connectors 50 so as to pull the net away from the sign and prevent deflection thereof toward the sign.

Figure 24:
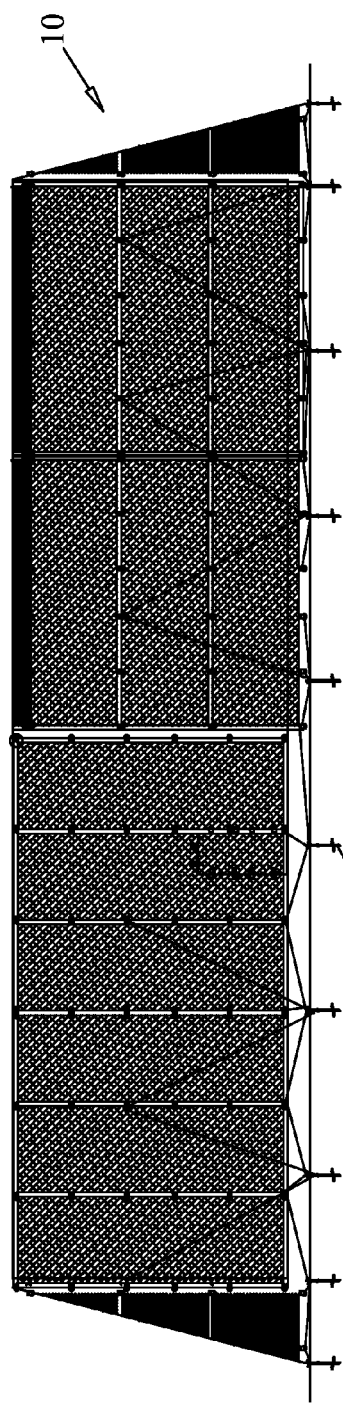
FIG. 24 is a side view of a mobile home adapted with the hurricane net wind abatement system of the present invention.
Figure 25:
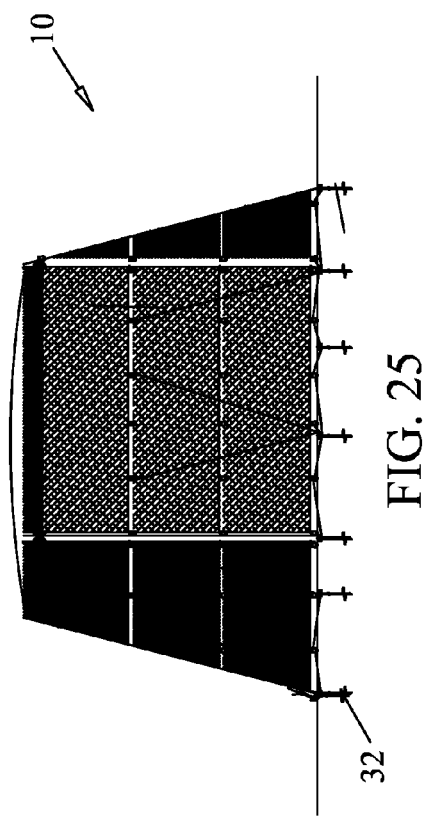
FIG. 25 is an end view thereof.
Figure 26:
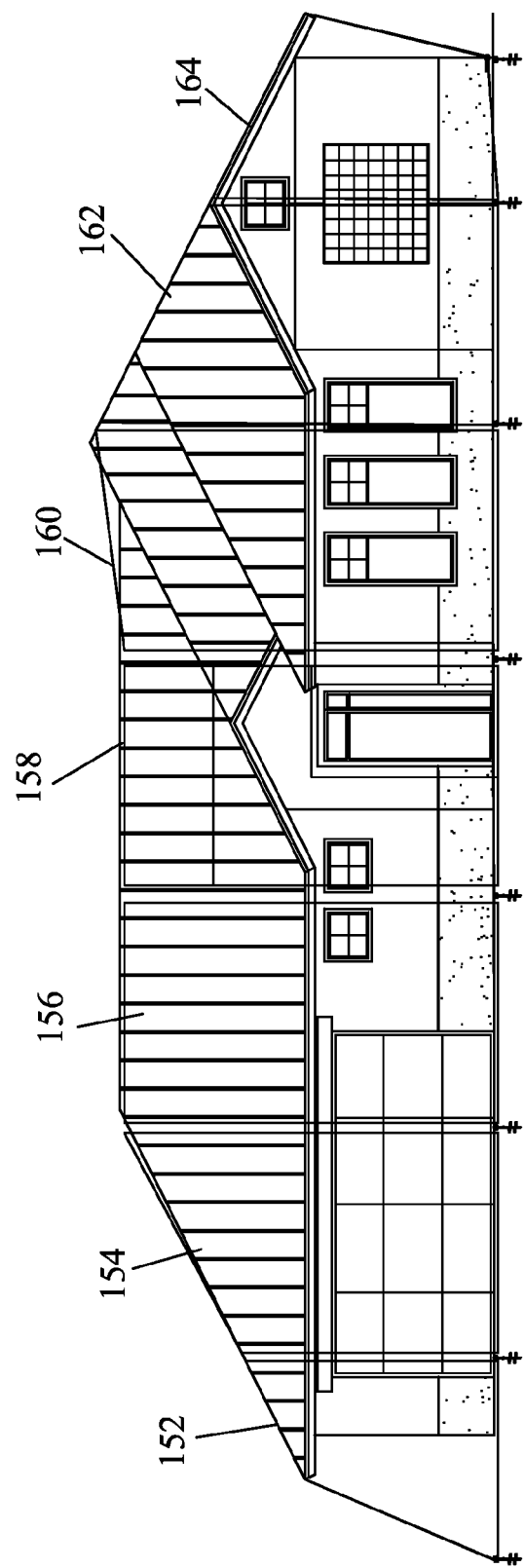
FIG. 26 is a schematic illustration of a home adapted with the hurricane net wind abatement system of the present invention in a complete coverage configuration.

FIGS. 24-30 depict a hurricane net wind abatement system according to the present invention adapted for protecting buildings and structures. FIGS. 24 and 25 illustrate the present invention installed in covering relation with a shed or trailer home structure. As illustrated therein, net section components 10 are interconnected by connectors 50 to form a net structure suitable in size and shape to provide substantially complete cover for the structure. The entire assembly is further anchored to the ground with ground anchors 32. As should be apparent, net sections may be cut or otherwise modified to fit the structure or portions thereof. FIG. 26 provides a schematic illustration of the hurricane net system of the present invention installed in covering relation with a conventional single story home in a configuration wherein the entire home is covered and protected from wind borne debris. As should now be apparent, the present invention provides a modular system adaptable for protecting an entire structure. FIG. 26 illustrates interconnected and ground anchored modules, referenced as 150, 152, 154, 156, 158, 160, 162, 164, that cooperate to provide substantially complete cover and complete protection of the home.

Figure 27:
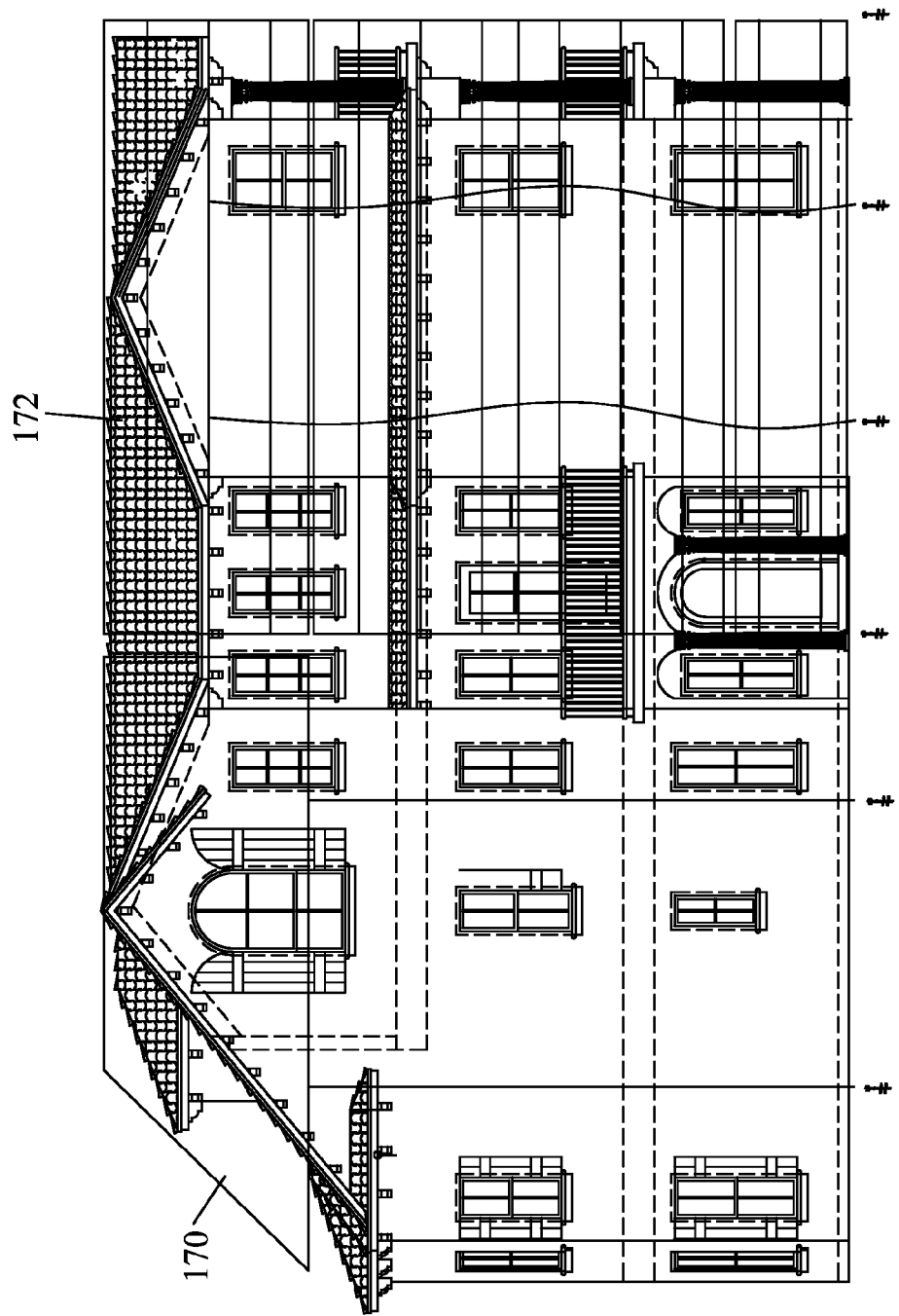
FIG. 27 is a schematic illustration of a multi-level/multi-family building adapted with the hurricane net wind abatement system of the present invention in a partial coverage configuration.
Figure 28:
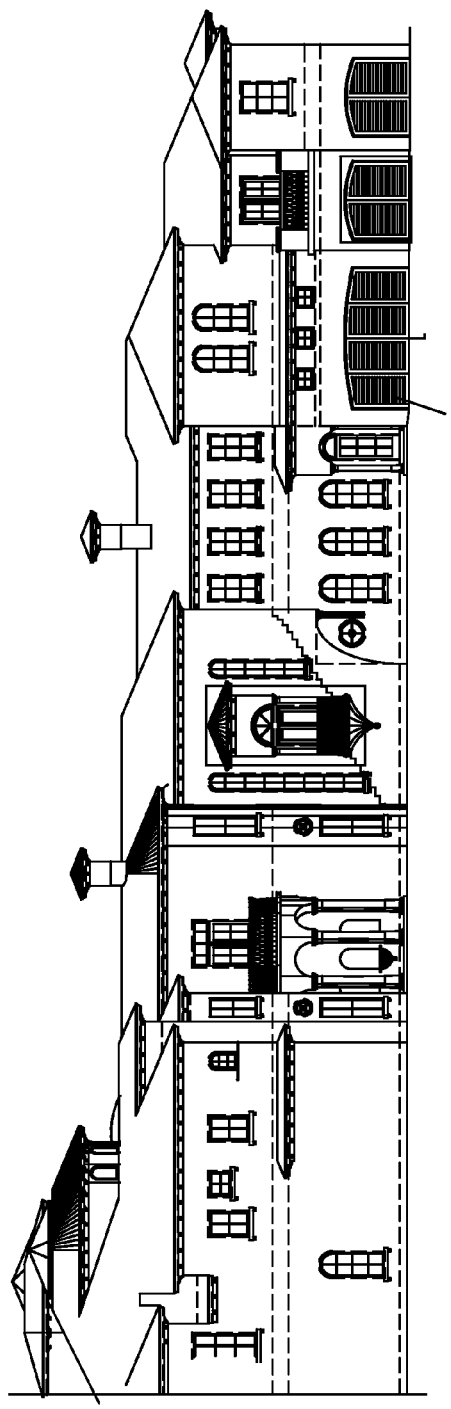
FIG. 28 is a front elevation view of a structure having selected door openings adapted with the hurricane net wind abatement system of the present invention.
Figure 30:
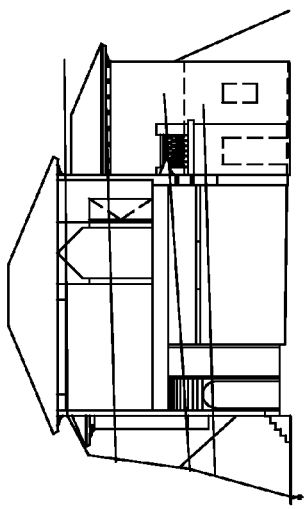
Figure 29:
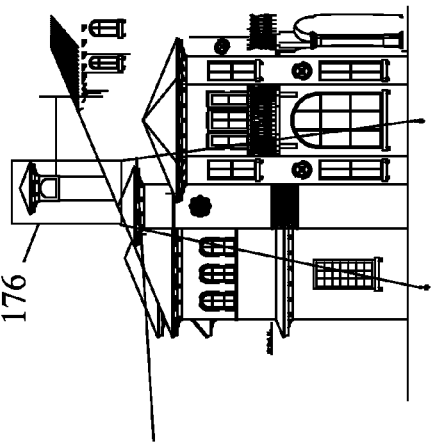
FIG. 29 is an elevation view depicting the hurricane net wind abatement system adapted to protect the chimney of a building.

FIGS. 27-30 further illustrate use of the hurricane net system of the present invention to protect a multi-story structure and/or particular portions thereof. FIG. 27 illustrates use of the hurricane net in a first modular configuration, referenced as 170, to cover only the roof whereby existing storm shutters or impact glass provide protection for the windows and doors. As further illustrated by FIG. 27, an adjacent portion of the structure, referenced as 172, is provided with complete net coverage. FIG. 28 illustrates use of the hurricane net system to protect complex portions of a structure, namely, a raised entry way and balcony 174, and a ground level doorway 176. FIG. 29 illustrates use of the hurricane net system to protect a chimney 176 at the top of the structure. FIG. 30 illustrates use of an intermediate rope connection to pull the net away from the structure and prevent windborne debris from deflecting the net into the structure.

FIG. 31 illustrates the versatility of use of the hurricane net wind abatement system to secure a boat and trailer. FIG. 32 further illustrates another use of the hurricane net wind abatement system to secure debris, such as foliage, landscaping, or construction debris. As should be apparent, the hurricane net wind abatement system of the present invention is adaptable for use in protecting virtually any structure of thing from wind damage and wind blown impact.

FIGS. 34-48 depict a preferred embodiment clamp, referenced as 200, for use with the present invention. Clamp 200 includes first and second matingly connectable clamp members, generally referenced as 201 and 202 respectively. First and second clamp members 201 and 202 are configured for mating connection with a portion of net material securely sandwiched therebetween. First clamp member 201 comprises a rigid body having a hook-shaped end 203 a mid section having a recessed notch 205 and a latching groove 207, and an opposing end defining a through bore 209. Second clamp member 202 comprises a rigid body having a generally U-shaped end 204 with first and second projecting legs 204A and 204B, a mid section defining a projecting boss 206 and latch member 208, and an opposing end defining a through bore 210.

Figure 49:
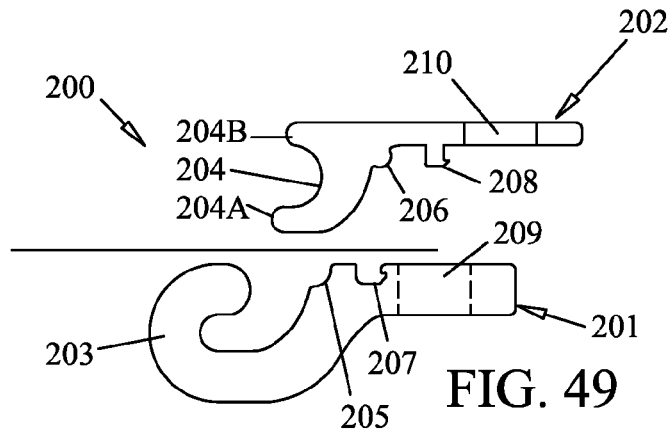
Figure 50:
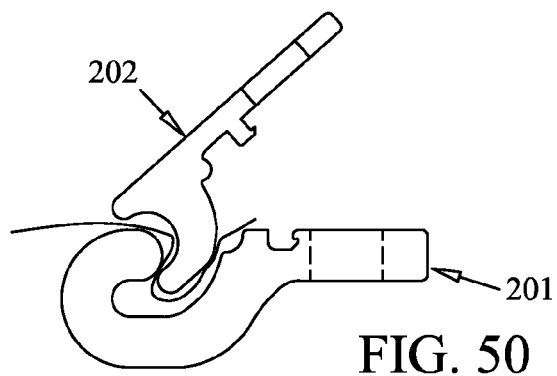
Figure 51:
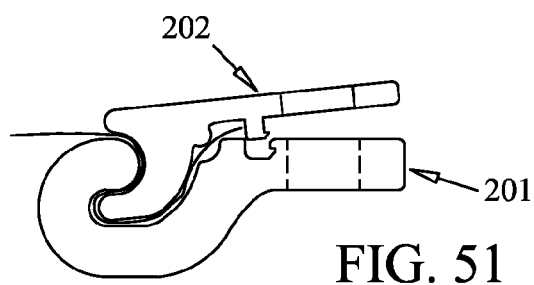
Figure 52:
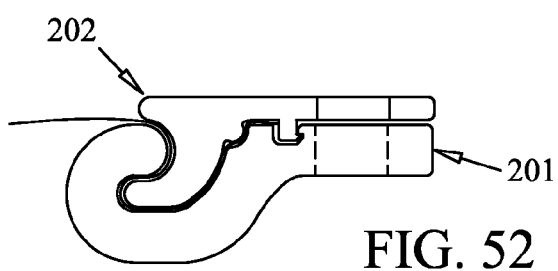

Clamp 200 functions to secure a portion of net material in sandwiched relation between first and second clamp members 201 and 202 by joining the clamp members as illustrated in FIGS. 49-52. More particularly, an edge portion of net material is positioned between first and second clamp members 201 and 202 as depicted in FIG. 49. The net material is preferably extended over the hook-shaped end such that the edge of the net material extends approximately to the center of through bore 209. Next second clamp member 202 is brought into engagement with first clamp member 201 such that hook-shaped end 203 of first clamp member 201 matingly receives U-shaped end 204 by inserted pivotal rotation of second clamp member 202. The first and second clamp members are secured by snap-fit engagement of latch member 208 on second clamp 202 within latching groove 205 formed on first clamp 201 as finally illustrated in FIG. 52. Projecting boss 206 further sandwiches a portion of the net within recessed notch 205 in a press fit configuration thereby further securing the net. Through bores 209 and 210 are aligned in the clamped configuration to allow for fasteners, straps, hooks, cables, rope, and the like to pass through the clamp. As best depicted in FIGS. 41, 42, 45, and 46, the through bores are include a circular center portion, referenced as 209A and 210A, and elongate slotted portions, referenced as 209B and 210B extending therefrom.

Once the net is secured using one or more clamps 200 along a peripheral net edge, the net may be secured in proximity to a structure or article of property in a variety of secured configurations. FIG. 53 illustrates securing a clamp to wood using a fastener inserted through clamp openings 209 and 210 having a first end adapted with wood threads and a second end adapted with machine threads and a wing nut. FIG. 54 illustrates clamp 200 secured to a hook. FIG. 55 illustrates clamp 200 and net 10 secured to a wall with a threaded fastener. FIGS. 56 and 57 illustrate securing clamp and net 10 using a concrete anchor 24 and ground anchor 22 respectively. FIG. 58 illustrates combined attachment of two clamp members, referenced as 200A and 200B, using a threaded fastener. FIG. 59 depicts and alternate embodiment clamp 300 wherein the clearance between respective clamp members is increased to receive overlapping net sections. FIG. 60 illustrates a net-to-net connection using aligned grommets. FIG. 61 shows two net sections, referenced as 10A and 10B, connected using connected clamps 200A and 200B connected in the configuration seen in FIG. 58. FIG. 62 depicts use of the alternate embodiment clamp 300 attached to the middle portion of a net 10 with tension applied using a rope 40. FIG. 63 illustrates a net-to-net connection using a threaded fastener and washers inserted through aligned grommets.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An impact resistant wind abatement system for installation in proximity to a structure to protect the structure against wind related damage, said wind abatement system comprising:
    at least one net component;
    at least one clamp assembly connectable said at least one net component;
    said clamp assembly including first and second clamp members matable along a longitudinal axis;
    said first clamp member comprises a rigid body having a hook-shaped end generally aligned with said longitudinal axis, a mid-section defining a detent, said mid-section further including a latching groove defined generally perpendicular to said longitudinal axis, and an opposing end defining a through bore formed along a through bore axis that is generally perpendicular relative to said longitudinal axis;
    said second clamp member comprises a rigid body having a generally U-shaped end defining first and second legs projecting generally parallel to said longitudinal axis, a mid-section defining a projecting boss and latch member projecting generally perpendicular to said longitudinal axis, and an opposing end defining a through bore formed along a through bore axis that is generally perpendicular relative to said longitudinal axis;
    each of said through bores defining a generally circular mid portion and elongate slotted portions extending from opposing sides of said circular mid portion and perpendicular to said longitudinal axis;
    said clamp assembly configurable to a closed configuration with a portion of said net component sandwiched between said hook shaped end and said U-shaped end so as to be routed through at least one approximately 90-degree turn within a plane disposed generally parallel with said longitudinal axis by mating engagement of said second clamp member U-shaped end with said first clamp member hook-shaped end and pivoting said clamp members together such that said opposing ends are disposed in generally parallel face-to-face relation with said boss received within said detent, and said latch member received within said groove securing said clamp assembly in the closed configuration via snap fit engagement without requiring the use of additional fasteners, with said through bores generally aligned, and with at least a portion of said net component sandwiched therebetween such that said net component is secured without being punctured by said clamp assembly;
    means for connecting said net component to the structure; and
    means, connected to said clamp assembly, for anchoring said net component to the ground.

2. A wind abatement system according to claim 1 wherein said means, connected to said clamp assembly, for anchoring said net component to the ground is secured to said clam assembly through said first and second clamp member through bores.

3. A wind abatement system according to claim 1, wherein said net component is fabricated by PVC coated polyester core yarn.

* * * * *